United States Patent Office 3,449,572
Patented June 10, 1969

3,449,572
DOSIMETER FOR SENSING ULTRAVIOLET RADIATION
Kermit H. Sylvester, Zion, and William E. Franz and Robert M. McGlathery, Waukegan, Ill., assignors to Chemilumen Corporation, Waukegan, Ill., a corporation of Illinois
No Drawing. Filed Feb. 6, 1967, Ser. No. 614,055
Int. Cl. H01j 39/00; G01t 1/00, 1/16
U.S. Cl. 250—83
22 Claims

ABSTRACT OF THE DISCLOSURE

A method and apparatus for detecting ultraviolet radiation which is insensitive to visible radiation and infrared radiation employing a solution of a 2,3,5-triphenyl-2H-tetrazolium chloride based composition as the sensitive medium.

This invention relates to a system for detecting or sensing ultraviolet radiation which is insensitive to visible rays and infrared rays.

This invention is based on the discovery that under certain conditions 2,3,5-triphenyl-2H-tetrazolium chloride based compositions are sensitive to ultraviolet radiations, and that when used in accordance with this invention, they will provide an accurate measurement of the amount of ultraviolet radiations, as well as a definition of the area exposed to such radiation.

The ultraviolet radiation detectors have many functional uses, including the detection of ultraviolet radiations of the type which cause sunburn to human skin. The literature indicates generally that the maximum sunburn occurs or is caused (maximum erythemogenic effect) by ultraviolet radiations within the 2500–3000 A. unit wavelength. Any device which is to be an effective warning device or detection device for sunburn must be sensitive not only to the normal radiation emitted by the sun which is received by the earth's surface, i.e., that between 2500 A. and 3660 A., but also to the shorter wavelength radiations which may be artificially produced. The part of the spectrum which lies between 0.0000295 centimeter and 0.000032 centimeter are sometimes called the vital rays. Radiation in the form of shorter waves, 0.000025 centimeter and less (that portion of the spectrum which includes X-rays) is extremely dangerous, especially to the eyes of people.

It has been found that the 2,3,5-triphenyl-2H-tetrazolium chloride based compositions, under proper conditions, are sensitive only to electromagnetic radiations of 4000 A. wavelength and shorter. Thus, such detection devices are not activated by normal light which is found indoors, but is sensitive only to the ultraviolet region rays which are potentially harmful.

One embodiment of this invention contemplates a sunburn dosimeter using the triphenyltetrazolium chloride based compositions as the indicator. Such a dosimeter may be made by coating or otherwise treating cloth, paper or a like substrate with the triphenyltetrazolium chloride compositions of this invention and mounting the so-treated substrate adjacent to a color standard. This combination of the treated substrate and the color standard may be worn into the sunlight, such as in the form of a bracelet, or held to a convenient portion of the skin with a pressure sensitive adhesive. When the treated substrate portion of the sunburn dosimeter reached the color of the appropriate color standard, the wearer would know how much sunburn or sun exposure he had been subjected to.

Another embodiment of this invention contemplates the use of triphenyltetrazolium chloride based compositions coated on or applied to appropriate substrates, such as paper, for use as a non-silver photographic reproduction system, and particularly as a substitute for diazo-type reproduction processes.

2,3,5-triphenyl-2H-tetrazolium chloride, herein called triphenyltetrazolium chloride, is well known and can be prepared from formazylbenzene by oxidation with mercuric oxide and treatment with alcoholic hydrogen chloride. It has been found that certain triphenyltetrazolium chloride containing solutions are sensitive to electromagnetic radiations having wavelengths of 4000 A. units or shorter. When the triphenyltetrazolium chloride is in certain alkaline solutions, or when it is deposited from such alkaline solutions onto substrates, this senitivity to ultraviolet radiations is evidenced by a progressive change in color from water white to pink, to red, and then finally to a red-brown. When the triphenyltetrazolium chloride is in acidic media, or is precipitated from acidic media, this sensitivity is evidenced by a change in color from a clear or water white to yellow and then to chartreuse.

It has been found that the change in color of the triphenyltetrazolium chloride composition is proportional to the time and intensity of the radiation and to some degree is independent of the concentration of the triphenyltetrazolium chloride present in the composition. The pH of the solution will affect the rate of color development. The further the pH is from 7.0, the faster the color development will be. That is, when the solution is basic or alkaline, as the pH becomes higher (more alkaline) the speed of color development increases. On the other hand, when the triphenyltetrazolium chloride composition is acidic, as the pH decreases (becomes more acid) the speed of color development increases. The solution must be non-neutral.

Of the alkaline reagents, it has been found that ammonium hydroxide gives excellent results and presently is the preferred reagent for use with the triphenyl tetrazolium chloride solutions of this invention, since such solutions are not sensitive to visible light. Sodium hydroxide is useful, but does not work as well as ammonium hydroxide. It has been found that the carbonates, including sodium, potassium and ammonium, do not work at all. Of the acidic reagents, it has been found that hydrochloric acid is a suitable reagent.

Broadly, this invention contemplates that in addition to the 2,3,5-triphenyl-2H-tetrazolium chloride, the following similar compounds may be used: 2,3,5-triphenyl-2H-tetrazolium bromide; 2,3,5 - triphenyl - 2H - tetrazolium iodide; 2-p-tolyl-3,5-diphenyl-2H-tetrazolium chloride. These compounds and other compounds corresponding to the formula:

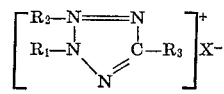

in which $R_1$, $R_2$ and $R_3$ are the same or different alkyl radicals such as methyl, ethyl, propyl, isopropyl, butyl, isobutyl, amyl, hexyl, undecyl, and dodecyl; or aryl radicals such as phenyl, tolyl, naphthyl, oxyphenyl, carboxyphenyl, aminophenyl, and alkoxylphenyl; and where the X is a halogen atom such as chlorine, bromine, or iodine. However, at the present time 2,3,5-triphenyl-2H-tetrazolium chloride is preferred.

Broadly, this invention contemplates the use of solutions of triphenyltetrazolium chloride to sense ultraviolet radiations, but it is preferred that such solutions be used to wet, coat, impregnate or otherwise treat an appropriate substrate. Since it has been found that an aqueous based solution containing about 2% by weight of the triphenyltetrazolium chloride is sufficient to treat cardboard, simply by wiping the cardboard with a cotton swab dipped in the 2% solution, it is obviously economically desirable to use a treated substrate as the color indicator rather than a solution per se.

Any desired type of substrate may be used, including paper, textiles (including both woven and non-woven such as silk, cotton or rayon), plastic films such as polyethylene, cellulose acetate and the like, wood and similar rigid or flexible materials. The substrate may be pre-coated or pre-treated in any desired manner, and may be post-treated as well, to form a laminated or sandwich-type device.

The system by which the substrate is coated may vary over wide limits. The preferred method is to form an aqueous solution, having an alkaline reaction, of the triphenyltetrazolium chloride, and use that solution to spray, roll, dip or otherwise moisten the substrate. This operation should be followed by drying, although it is not necessary for the substrate to be dry in order to function, but it makes for easier handling. The drying is preferably accomplished in the absence of any light, but it is essential only to keep ultraviolet light out of the drying area. The invention also contemplates the use of non-aqueous solvent systems such as alcohol or acetone and mixed solvent systems such as alcohol and water as a vehicle for the triphenyltetrazolium chloride in the coating process.

This invention contemplates triphenyltetrazolium chloride based compositions used to treat or coat various substrates which may be sized and/or coated with suitable materials of various types including pigments such as silicas, starch, aluminas, alumino-silicate, and synthetic polymeric materials which may be bound to a base sheet by appropriate resinous binders. A wide variety of pre-coating materials, including dyes, fillers, pigments and binders in combinations and/or alone, have heretofore been used for photographic purposes, and more specifically for diazo-type coatings of sheet material. These coating materials generally contribute to the surface smoothness and tend to improve the dye or color density, especially where images are developed from dye formers such as diazonium compounds. It is contemplated by this invention that such materials will be useful when the triphenyltetrazolium chloride based compositions of this invention are substituted for such diazo or other photographic compounds.

It is further contemplated that the triphenyltetrazolium chloride based compositions of this invention may be used in combination with various prior art diazo compounds, in which case a compatible solvent system is preferred. In such cases it may be desirable to use coupling inhibitors, such as tartaric acid, stabilizers such as zinc chloride, background inhibitor such as thiourea, and couplers such as resorcinol or mono-ethanol amide. In some cases, even where the diazo salt is not used, it may be desirable to use various stabilizers or inhibitors of the types mentioned above.

As mentioned above, the substrates treated with triphenyltetrazolium chloride based compositions will go to a dark red color when exposed to the ultraviolet light. The addition of sodium bromide to the triphenyl tetrazolium composition, or the treatment of the exposed diazo paper to a sodium bromide solution after exposure, will cause developed color to go to a brown rather than a red color.

Further, it has been found that a 10% solution of sodium thiosulfate (hypo) will stabilize the color developed by the triphenyltetrazolium chloride based compositions. This aspect, of course, is very important with regard to the diazo type processes or other photographic type processes where it is desired to arrest the color development and prevent fading. The hypo treatment is likewise effective as a stabilizing mechanism where sodium bromide has been added to the triphenyltetrazolium chloride based composition. In practice, the hypo solutions may be used in connection with the present invention by dipping an exposed treated substrate at a point in time when the desired color and color density is achieved. The hypo solution stops any further color development and stabilizers the color against fading.

The following examples are given by way of illustration and not limitation. Throughout the specification and claims the parts and percentages are given on a weight basis.

EXAMPLE I

A base solution was made up by mixing 30 milliliters of ammonium hydroxide (Baker's reagent grade, 3 normal) with 20 milliliters of distilled water and adding to this solution, one gram of triphenyltetrazolium chloride with stirring. This base solution was not sensitive to incandescent light, and all the mixing operations can be carried out under incandescent light, but caution must be exercised not to admit any ultraviolet light, such as is normally present in daylight. This solution has a good shelf life, but when exposed to ultraviolet radiation, or any electromagnetic radiations having a wavelength of 4000 A. or less the solution turns from a water-white colorless solution, to pink, then red, and then finally to a red-brown color. The color developed is roughly proportional to the intensity and duration of exposure.

It has been found that the shelf life of the base solution described in Example I is good, but it is preferred that this solution be stored in a dark, cool place, and it is essential that the solution be stored where it is not subjected to the influence of ultraviolet or higher frequency radiations.

EXAMPLE II

Several 3 x 5 file cards, made of lightweight cardboard were coated with a base solution (as described in Example I), made up on July 11. After coating, the cards appeared to be colorless, and it was difficult to discern precisely what part of the card was actually coated. These cards were exposed sequentially to sunlight, on a cloudy afternoon on Sept. 17, 1966 at Waukegan, Ill. These card samples achieved a color of 37 MRO (using the ISCC–NBS color-name chart) after about 20 minutes, and a color of 35 SRO (ISCC–NBS) was achieved after about 35 minutes.

EXAMPLE III

A 3 x 5 file card was hand coated in the absence of ultraviolet light, with the base solution described in Example I. This card was placed in the quick freeze section of a home freezer and there exposed to ultraviolet light from a 250-watt General Electric sunlamp for one minute at a distance of about 6 inches. The temperature of the card before, during and after was between —20° F. and —40° F. In less than one minute the color development was complete.

EXAMPLE IV

A soft polyethylene disc was wetted with the base solution described in Example I. A portion of the polyethylene disc was then exposed to natural ultraviolet light (the balance being screened or shaded from the U.V. light). The portion of the disc which had been exposed turned red, but the screened or shaded portion remained unchanged. The solution was washed off, and without further treatment, the image was fixed and did not fade.

It has been found that certain materials appear to have a catalytic effect on the rate at which the triphenyltetrazolium chloride develops color. The examples below demonstrate the use of starch and phosphoric acid to speed up the color development, but other similar materials, such as organo phosphates or various reducing carbohydrates, may be useful under some conditions.

EXAMPLE V

A starch suspension was made up by adding one gram of ordinary laundry starch to 100 milliliters of water.

This mixture was stirred, and then boiled for about five minutes, followed by cooling for a period of time to allow the suspension to settle. Twenty milliliters of the starch suspension was added to a mixture of one gram of triphenyltetrazolium chloride dissolved in 30 milliliters of ammonium hydroxide (Baker's reagent grade, 3 normal). This was stirred until a faint yellow solution was obtained.

This solution was hand coated on 3 x 5 cards which were exposed to ultraviolet radiations by using a 250-watt General Electric sunlamp at 6 inches, for a duration of approximately one minute. This developed a deep color.

The presence of the starch seemed to give the solution a little more body and allowed the solution to be coated smoothly and evenly on a 3 x 5 card, simply by wiping the solution on the card with a cotton swab.

EXAMPLE VI

Solution A was made up by adding 5 milliliters of phosphoric acid (2.5% $H_3PO_4$) to 50 milliliters of the base solution described in Example I above. Solution A was used to coat a 3 x 5 card by hand. The coated card was exposed to a 250-watt General Electric sunlamp at a distance of 6 inches for one minute. The dark red color appeared in less than one minute's time. This is slightly faster than the color development shown by the control.

An additional 5 milliliters of 2.5% phosphoric acid (making a total of 10 milliliters of phosphoric acid per 50 milliliters of the base solution described in Example I) was added to 50 milliliters of solution A described above, to form solution B. Solution B was coated on a 3 x 5 inch card, which was then exposed to G.E. sunlamp under the conditions described above. The color development was slower, but the intensity and resolution were good. This one had the rate of color development, color intensity and resolution approximately the same as the control.

Solution C was formed by adding a further 5 milliliter portion of 2.5% phosphoric acid to solution B (for a total of 15 milliliters of phosphoric acid per 50 milliliters of the stock solution described in Example I). Solution C was used to coat a 3 x 5 inch card, which was then exposed under the same time and conditions as above, in order to develop its color. The color development was slower, taking more than one minute, than either the control or the solution B experiment.

A control card was made up simply by coating a 3 x 5 inch card with the base solution described in Example I. This was given the same exposure to a 250-watt General Electric sunlamp to give a full color development after approximately one minute.

EXAMPLE VII

A stock solution, as in Example I, was made up from 30 milliliters of ammonium hydroxide (3 normal), 20 milliliters of distilled water, and one gram of triphenyltetrazolium chloride. To this solution was added 2 grams of laundry starch. A 5 milliliter portion of this solution was then mixed with 10 milliliters of 2.5% phosphoric acid. This mixture was applied to 3 x 5 inch cardboard file cards using a cotton swab. The cards were allowed to dry in the dark, in the absence of ultraviolet light. These cards were then exposed to a fluorescent tube emitting ultraviolet light in the 3600 A. wavelength at an intensity of 1600 florens. It was observed that the red color developed immediately. The cards were fixed with hypo and remained color stable.

It has been found that the stock solution, as made up in Example I, from water, ammonium hydroxide, and triphenyltetrazolium chloride is miscible with acetone, alcohol and other similar solvents, but will not mix with carbon tetrachloride. However, dispersions of carbon tetrachloride in the stock solution may be useful as described below in Example VIII.

EXAMPLE VIII

Pieces of Styrofoam (polystyrene which has been foamed by blowing with various gaseous agents) weighing a total 3.7 grams were mixed into 10 milliliters of carbon tetrachloride until a viscous, saturated solution was formed. To this viscous solution, 4 milliliters of the base solution, as described in Example I, were added, to form a pourable sticky rubbery material, somewhat like chewing gum, which had a very faint pink color. This color persisted and was stable in the absence of any further exposure to ultraviolet light. This rubbery material was coated on a 3 x 5 card and was exposed to a 250-watt General Electric sunlamp at the intensity and for the time recommended for sun bathing. The card changed from colorless to orange during this time. As the exposure was continued, it was found that the color development was constantly changing and ultimately went to a blood red. The color development stopped as soon as the ultraviolet light source was removed. This material, when coated on substrates, appears to be colorless and has the advantage of being waterproof. Upon exposure to ultraviolet radiations, a coated substrate will develop a red color which is proportionate to the intensity and time of exposure to the ultraviolet radiations.

This invention contemplates the use of the triphenyltetrazolium chloride composition in combination with various other plastic or waxy materials, similar to that described in Example VIII, including polyethylene, polypropylene, various polyesters and polyurethanes, nylon, phenyl formaldehyde and similar synthetic polymers, as well as the artificial and natural waxes.

It has been found that a green colored substrate reflecting light of about 5500 A., when treated with the base solution described in Example I will develop an image, which, when exposed to ultraviolet light, appears to be black on the green background.

For purposes of this patent application the term triphenyltetrazolium chloride shall mean the same as 2,3,5-triphenyl-2H-tetrazolium chloride.

It will be apparent to those skilled in the art that many widely different embodiments of this invention may be made without departing from the spirit and scope thereof and, therefore, it is not intended to be limited except as indicated in the appended claims.

We claim:

1. A device for sensing electromagnetic radiations having wavelengths shorter than 4000 A. which comprises a non-neutral solution of compound corresponding to the following formula:

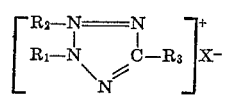

wherein $R_1$, $R_2$, and $R_3$ are the same or different radicals selected from the group consisting of methyl, ethyl, propyl, isopropyl, butyl, isobutyl, hexyl, amyl, phenyl, tolyl, naphthyl, oxyphenyl, carboxyphenyl, and aminophenyl, and wherein the X is halogen atom selected from the group consisting of chlorine, bromine, and iodine.

2. A device for sensing ultraviolet radiations as described in claim 1 wherein the compound is 2,3,5-triphenyl-2H-tetrazolium chloride.

3. The device for sensing ultraviolet radiations as described in claim 2, wherein the triphenyl tetrazolium chloride is dissolved in an alkaline media.

4. The device for sensing ultraviolet radiation as described in claim 3, wherein the triphenyl tetrazolium chloride is dissolved in an aqueous alkaline media.

5. A device for sensing ultraviolet radiations as described in claim 4 wherein the triphenyltetrazolium chloride is dissolved in a solution of about 60% ammonium hydroxide (3 normal), 40% distilled water, and about 2% triphenyltetrazolium chloride.

6. A device for sensing electromagnetic radiations having wavelengths shorter than 4000 A. which comprises a compound corresponding to the following formula:

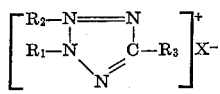

wherein $R_1$, $R_2$, and $R_3$ are the same or different radicals selected from the group consisting of methyl, ethyl, propyl, isopropyl, butyl, isobutyl, hexyl, amyl, phenyl, tolyl, naphthyl, oxyphenyl, carboxyphenyl, and aminophenyl, and wherein the X is halogen atom selected from the group consisting of chlorine, bromine, and iodine, wherein said compound is disposed on a substrate.

7. A device for sensing ultraviolet radiations as described in claim 6 wherein the compound is 2,3,5-triphenyl-2H-tetrazolium chloride.

8. The device for sensing ultraviolet radiations as described in claim 7, wherein the triphenyl tetrazolium chloride is deposited on the substrate from an alkaline media.

9. The device for sensing ultraviolet radiation as described in claim 8, wherein the triphenyl tetrazolium chloride is deposited on the substrate from an aqueous alkaline media.

10. A device for sensing ultraviolet radiations as described in claim 3 wherein the triphenyltetrazolium chloride is deposited from a solution of about 60% ammonium hydroxide (3 normal), 40% distilled water, and about 2% triphenyltetrazolium chloride.

11. An ultraviolet radiation sensing device as described in claim 10, wherein the solution from which the triphenyltetrazolium chloride is deposited, contains starch.

12. An ultraviolet radiation sensing device as described in claim 10, wherein the solution from which the triphenyltetrazolium chloride is deposited, contains phosphoric acid.

13. A dosimeter for indicating exposure to electromagnetic radiations having wavelengths shorter than 4000 A. which comprises the combination of a color standard and a device for sensing ultraviolet radiation as described in claim 8.

14. A dosimeter for indicating exposure to electromagnetic radiations having wavelengths shorter than 4000 A. which comprises the combination of a color standard and a device for sensing ultraviolet radiations as described in claim 9.

15. A method as described in claim 10 wherein the solution contains phosphoric acid.

16. A method of making a device for sensing electromagnetic radiations having a wavelength less than 4000 A. which comprises forming a solution containing triphenyltetrazolium chloride, wetting a substrate with said solution, and drying said substrate.

17. A method as described in claim 13 wherein the solution is aqueous and contains ammonia.

18. A method as described in claim 14 wherein the solution contains starch.

19. A method as described in claim 14 wherein the solution contains phosphoric acid.

20. A method as described in claim 14 wherein the solution contains phosphoric acid and starch.

21. A method of making a device for sensing ultraviolet radiations having wavelengths shorter than 4000 A. which comprises forming a saturated solution of polystyrene in carbon tetrachloride, mixing therewith an alkaline aqueous solution of triphenyltetrazolium chloride, and coating the mixture on a substrate.

22. A method as described in claim 21 wherein the triphenyltetrazolium chloride solution is made alkaline by ammonium hydroxide.

References Cited

UNITED STATES PATENTS

| | | |
|---|---|---|
| 3,194,963 | 7/1965 | McKee. |
| 3,185,696 | 5/1965 | Tien _____ 250—71 X |
| 3,226,545 | 12/1965 | Potsaid. |
| 3,290,499 | 12/1966 | Vale et al. _____ 252—408 X |
| 3,297,585 | 1/1967 | Hayden _____ 252—408 |

RALPH G. NILSON, *Primary Examiner.*

SAUL ELBAUM, *Assistant Examiner.*

U.S. Cl. X.R.

117—34; 204—154; 252—408